United States Patent Office 3,343,650
Patented Sept. 26, 1967

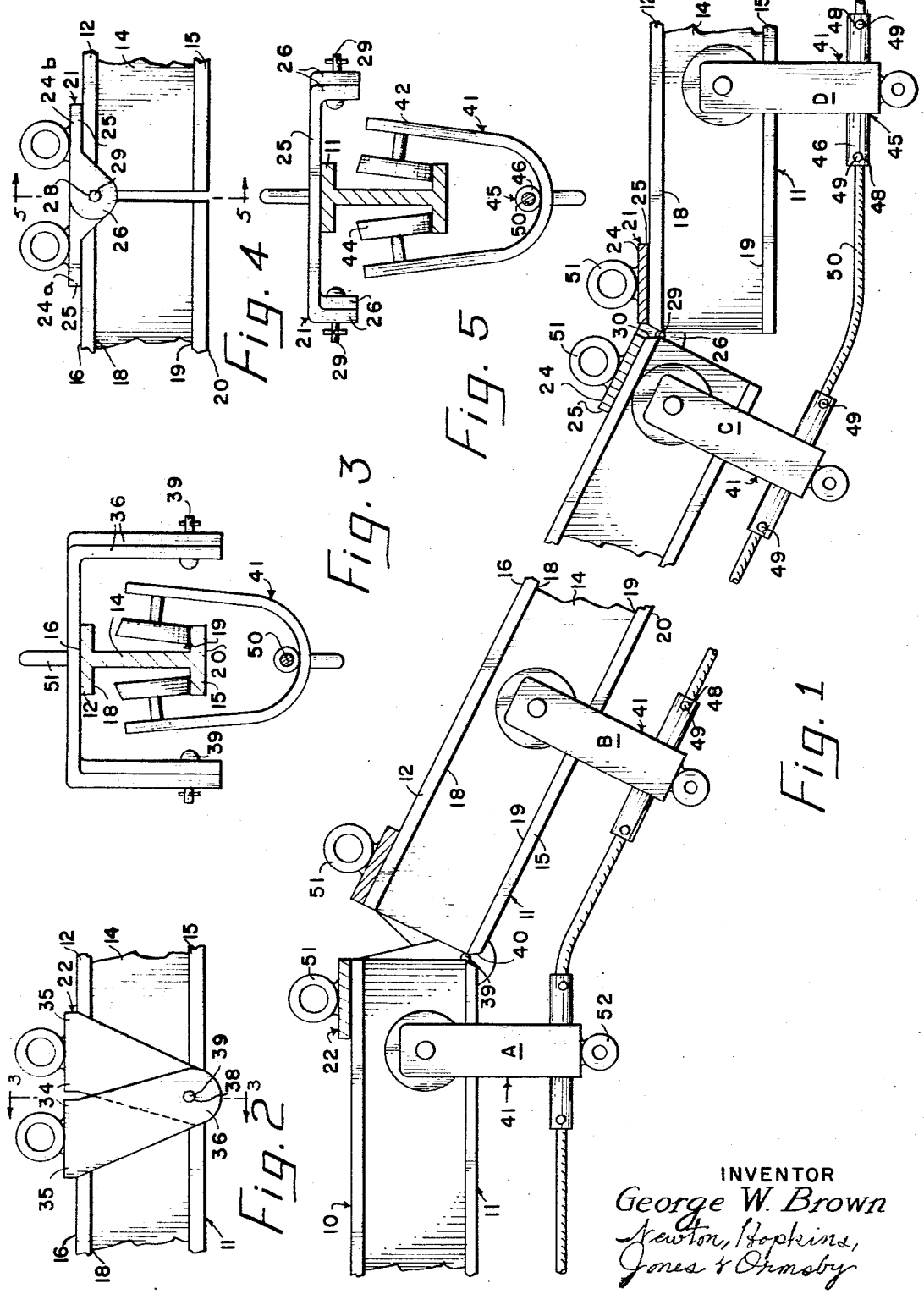

3,343,650
ADJUSTABLE CONVEYOR SYSTEM
George W. Brown, Atlanta, Ga., assignor to Gainesville Machine Company, Inc., Gainesville, Ga., a corporation of Georgia
Filed Sept. 28, 1966, Ser. No. 582,577
5 Claims. (Cl. 198—117)

ABSTRACT OF THE DISCLOSURE

An adjustable conveyor system of the type suspended from an overhead support and which can have various portions thereof suspended at different elevations, and the various portions can be adjusted in their elevation as desired.

Background of the invention

In the past, where it was desired to position or reposition portions of an overhead conveyor system at different elevations from the remainder of the conveyor system, it was necessary to reconstruct the conveyor system to provide the desired variations. Of course, reconstruction of a conveyor system in such a manner was expensive, time consuming, and required the conveyor line to be shut down for a period of time. Also, when initially constructing an overhead conveyor system for permanent installation it was necessary to construct the system with special tracks and supports to accommodate varying elevations in the system. Of course, these special tracks and supports were expensive to construct, expensive to stock and inconvenient to install.

While adjustable overhead conveyors have been constructed that permit varying the height of portions of a conveyor line, these conveyors have been expensive and cumbersome in construction, and the pivoting of portions of the conveyor around adjacent portions created undesirable gaps that hindered the travel of the trolley wheels over the track. Also, the elements necessary for pivoting the track were placed adjacent to or on the surface of the track in such a manner that the trolley wheels were required to pass over these elements, thereby further hindering the travel of the trolley wheel.

Summary of the invention

This invention comprises an adjustable conveyor system including a track composed of a plurality of I-shaped beams placed in end to end relationship and being pivotal at each end about its adjacent beam through an axis disposed in the plane of the upper surface of the lower flange of the I-shaped beams or through the lower surface of the upper flange of the adjacent I-shaped beams. A plurality of trolleys connected to each other by a continuous cable are provided for the adjustable conveyor system. Each trolley comprises a U-shaped support element having wheels rotatably connected at the ends of each leg and engageable with the upper surface of the lower flange of the track. Each trolley is connected to the continuous cable at the base of its U-shaped support element, and each U-shaped support element includes connecting means to which elements can be suspended from the conveyor system and conveyed over the length of the track.

Thus, it is an object of this invention to provide a method of pivoting the sections of a conveyor system track about the surface over which the trolley wheels travel.

Another object of this invention is to provide a conveyor system that is adjustable in elevation.

Another object of this invention is to provide a conveyor track which includes track sections being pivotal about adjacent ends.

Another object of this invention is to provide a conveyor track composed of a plurality of track sections placed end to end, the track sections being pivotal at their ends about adjacent track sections.

Another object of this invention is to provide a conveyor track comprising a plurality of track sections each being pivotal at its ends about an axis extending through the path over which the trolley of the conveyor is to pass.

Another object of this invention is to provide an adjustable conveyor system that is economical to manufacture, stock and assemble, and which is adjustable to meet the requirements of varying situations.

Other objects, features and advantages of the present invention will become apparent upon reading the following specification, taken in conjunction with the accompanying drawing.

Brief description of the drawing

FIG. 1 is a partial elevational view, with parts broken away, of the adjustable conveyor system;

FIG. 2 is a partial elevational view of the joint between adjacent track sections of the conveyor track, showing the track section pivotal about an axis extending through the planes of the upper surfaces of the lower flanges;

FIG. 3 is an end view of the joint between sections of the conveyor track, taken along lines 3—3 of FIG. 2;

FIG. 4 is a partial elevational view of adjacent track sections of the conveyor track, similar ot FIG. 2, but showing the adjacent track sections being pivotal about an axis extending through a plane common to the lower surfaces of the upper flanges of the tracks;

FIG. 5 is an end view of the conveyor track, similar to FIG. 3, and taken along lines 5—5 of FIG. 4.

Description of the embodiment

Referring now more particularly to the drawing, in which like numerals indicate like parts throughout the several views, FIG. 1 shows a conveyor track 10 which includes a plurality of track sections 11. As is shown in FIGS. 3 and 5, each track section 11 is I-shaped in cross section and includes an upper flange 12, intermediate web 14 and lower flange 15. Upper and lower flanges 12 and 15 are disposed parallel to each other and the track section 11 is disposed so that intermediate web 14 extends in a vertical plane while flanges 12 and 15 extend in a horizontal plane.

Upper flange 12 includes an upper surface 16 and a lower surface 18, while lower flange includes an upper surface 19 and a lower surface 20.

Track sections 11 are placed in end to end relationship to form the conveyor track 10 and are connected at their ends by hinge support means 21 or 22. Hinge support means 21 comprises a pair of hinged elements 24 and which includes a flat connecting leaf 25 and lobes 26 disposed at each side thereof. The lobes 26 define a central aperture 28, the axis of which extends parallel to the surface of the flat connecting leaf 25. The pair of hinged elements 24a and 24b of the end support means 22 are assembled by placing their lobes 26 adjacent each other so that their apertures 28 are aligned. A suitable pin 29 is inserted through the aligned apertures of adjacent lobes 26 so that the flat connecting leaf 25 of each hinged element is pivotal thereabout.

The flat connecting leaves 25 of the pair of hinged elements are connected to the upper surface 16 of the upper flange 12 of adjacent track sections 11, as by welding or other conventional means. The lobes 26 of the hinge support means 21 are displaced downwardly from the connecting leaves 25 a distance such that the apertures 28 of each lobe are coextensive with the plane of the lower surface 18 of the uper flange 12 of adjacent track sections 11. With this arrangement, the plane of the lower surfaces 18 of the upper flanges 12 of adjacent track sections 11 will pass through the pins 29 of the lobes 26 of the hinge support means 21, and be pivotal about the pins 29. In order that track section 11 remain free to pivot about the pins 29, the upper end of the upper flange 12 is beveled at 30 on each track section so that the upper flange 12 of adjacent track sections 11 will not interfere with these track sections pivoting about hinge pins 29.

Hinge support means 22 is similar in construction to hinge support means 21 and includes a pair of hinge elements 34 comprising flat connecting leaves 35, downwardly extending lobes 36 centrally apertured at 38. A pin 39 extends through the aligned apertures 38 so that the pair of hinge elements are pivotal about hinge pins 39. The flat connecting leaves 35 are connected to the upper surface 16 of the upper flange 12 of adjacent track sections 11 in a conventional manner, so that the track sections 11 are disposed in end to end relationship. Lobes 36 of hinge support means 22 extend downwardly from the upper flange 12 of the track sections a distance sufficient to place the apertures thereof in the plane of the upper surface 19 of the lower flange 15 of adjacent track sections 11. With this arrangement, the adjacent track sections will pivot about a hinge line disposed in the planes of the adjacent upper surfaces 19 of the adjacent lower flanges 15. In order that the adjacent track sections 11 be free to pivot in this manner, the lower end portions of the lower flanges 15 are beveled at 40.

A series of trolleys 41 are positioned on the conveyor track 10. Each trolley 41 includes a U-shaped support element 42 having trolley wheels 44 rotatably connected to the inner surfaces of the legs of the support element. The trolley wheels are postioned on either sides of the intermediate web 14 of the track sections 11 so that their outer perimeters normally engage the upper surface 19 of the lower flange 15 of the conveyor track 10. A cable gripper 45 is rigidly attached to the interior portion of the base of the U-shaped element 42. The cable gripper 45 comprises a hollow elongated tube 46 that extends parallel to the track sections 11 and is longer in length than the width of the U-shaped support element 42. The cable gripper 45 defines threaded apertures 48 adjacent each of its ends, and a set screw 49 is threadedly received therein for engaging a cable.

A continuous cable 50 extends between each of the trolleys 41 and is received in the hollow interior portion of the cable gripper 45 of each trolley. The set screws 49 of each cable gripper engage the cable 50 so that each trolley 41 is pulled along the conveyor track 10 by movement of the cable 50.

The conveyor track 10 is supported from an overhead support in any conventional manner. In the instant embodiment, the hinge support means 21 and 22 include rings 51 extending upwardly from the connecting leaves 25 so that hooks, cables or other connecting means can be connected thereto. In this manner, the conveyor track 10 would be supported in limbo from an overhead support. Furthermore, the trolleys 41 include conventional support means for suspending items therebelow. The instant embodiment includes rings 52 connected to the lower portion of the U-shaped support element 42 of the trolleys 41.

*Operation*

The conveyor track 10 is suspended from an overhead support by means of rings 51 connected to the connecting leaves 25 or 35 of the hinge elements 21 or 22, respectively. The trolleys 41 are positioned on the track sections 11 as shown in FIGS. 3 and 5 and the cable 50 extending between the trolleys 41 is pulled, by a conventional means (not shown), so that the trolley wheels 44 travel over the upper surface 19 of the lower flange 15 of each track section 11. In this manner, any item suspended from the rings 52 of each trolley 41 will be conveyed in the usual manner.

When it is desired to lower a portion of the conveyor track 10, the suspending means supporting the track section to be lowered from the overhead support is lengthened so that a bend in the conveyor track 10 is created, as shown in FIG. 1. As shown in FIG. 1, the central track section 11 is permitted to pivot about hinge pin 39 of hinge support means 22. Since hinge pin 39 is disposed in the planes of the upper surfaces 19 of adjacent lower flanges 15 of the adjacent track sections 11, the upper surfaces 19 will not be moved away from each other upon pivoting the adjacent track sections 11 in this manner. The beveled ends 40 of the lower flanges 15 allow the upper surfaces 19 of these flanges to remain in substantially coextensive relationship with each other. Thus, in this manner a relatively smooth surface is provided for the trolley wheels 44 to travel over.

Of course, when the conveyor track is to become level again the adjacent track sections 11 must be disposed as shown in the right side of FIG. 1. Here hinge support means 21 allows adjacent track sections 11 to pivot about the hinge pin 29 which is disposed in planes coextensive with the lower surfaces 18 of the upper flanges 12 of adjacent track sections. Since the upper flanges 12 are beveled at 30, the lower surfaces of the upper flanges are allowed to pivot about hinge pin 29 so that these surfaces are substantially coextensive with each other and provide a smooth surface for the trolley wheels 44 of the trolleys 41.

Because of the tension in the cable 50, the trolley A as shown in the left of FIG. 1 will be pulled downwardly onto the upper surface 19 of the lower flange 15 by its adjacent trolleys, while trolley C will be urged upwardly onto the lower surface 18 of the upper flange 12 of its track section by adjacent trolleys B and D. Thus, while a gap might be created between the lower flanges 15 of adjacent track sections 11 at the right side of FIG. 1, this gap will not have any effect upon the conveyor system since the trolley wheels 44 will be lifted out of engagement with the lower flange 15 of these track sections when passing in the vicinity of such a gap.

With this construction, it can be seen that a smooth, unencumbered surface is provided for the trolley wheels 44 of the trolleys 41 of the conveyor over the entire conveyor track 10, even when portions of the track are positioned at different elevations from the remaining portions of the track. The placement of the hinge pins 29 or 39 in the planes of the upper surfaces 19 of adjacent lower flanges 15 or in the planes of the lower surfaces 18 of adjacent upper flanges 12 provides a smooth transition for the trolleys 41 when passing from adjacent track sections. The construction of the conveyor is simple and economical to manufacture and maintain and the power required to move the trolleys over the conveyor track 10 is held at a minimum.

It will be obvious to those skilled in the art that many variations may be made in the embodiments chosen for the purpose of illustrating the present invention without depatring from the scope thereof as defined by the appended claims.

What is claimed as my invention is:

1. A conveyor track comprising a plurality of track sections, means for selectively positioning certain of said track sections at different elevations, said track sections each comprise an I-shaped beam including an upwardly extending central web and upper and lower laterally extending flanges, means for pivoting at least some adjacent track sections with respect to each other about a pivot point common to the planes of the lower surface of their upper flanges and means for pivoting other adjacent track sections with respect to each other about a pivot point common to the planes of the upper surface of their lower flanges.

2. A conveyor track including a plurality of track sections, said track sections each comprising a rectilinear I-shaped beam including an upwardly extending central web and upper and lower laterally extending flanges, first hinge means connected between some adjacent track sections being pivotal about a hinge line common to the plane of the lower surfaces of the upper flanges of the adjacent track sections, and second hinge means connected betwen other adjacent track sections being pivotal about a hinge line common to the plane of the upper surfaces of the lower flanges of the adjacent track sections.

3. The invention of claim 2 wherein said first and second hinge means are connected to the upper surfaces of their respective adjacent track sections and each include hinge pins laterally displaced on each side of the flanges of their said adjacent track sections.

4. A conveyor system including a plurality of conveyor track sections positioned in end to end relationship, said sections each defining first and second conveying surfaces, means for pivoting at least some adjacent track sections with respect to each other about a pivot point common to the planes of their first conveying surfaces, and means for pivoting other adjacent track sections with respect to each other about a pivot point common to the planes of their second conveying surfaces.

5. The invention of claim 4 wherein said first and second conveying surfaces are disposed in face to face parallel relationship.

References Cited

UNITED STATES PATENTS

| 1,454,675 | 5/1923 | Gantvoort | 198—177 X |
| 3,179,452 | 4/1965 | Daigle | 198—177 X |

FOREIGN PATENTS

| 747,422 | 3/1933 | France. |
| 856,397 | 12/1960 | Great Britain. |

EVON C. BLUNK, *Primary Examiner.*

EDWARD A. SPROKA, *Examiner.*